United States Patent [19]

Obst et al.

[11] 4,255,838
[45] Mar. 17, 1981

[54] SUPPORT FOR ELECTRICAL BUSBARS

[75] Inventors: Rudiger Obst; Manfred Wilmes; Peter E. Murray, all of Detmold, Fed. Rep. of Germany

[73] Assignee: C. A. Weidmuller K.G., Detmold, Fed. Rep. of Germany

[21] Appl. No.: 968,146

[22] Filed: Dec. 11, 1978

[30] Foreign Application Priority Data

Apr. 17, 1978 [DE] Fed. Rep. of Germany ....... 2816562

[51] Int. Cl.³ ............................................. A44B 21/00
[52] U.S. Cl. .......................... 24/255 BS; 24/255 SL; 174/171; 248/74 A; 403/347
[58] Field of Search ......... 24/255 BS, 255 SL, 255 R, 24/257; 248/74 A; 403/329, 347; 174/171, 175

[56] References Cited

U.S. PATENT DOCUMENTS

| 4,011,639 | 3/1977 | Koleske | 24/255 R |
| 4,083,523 | 4/1978 | Fisher | 248/74 A |

FOREIGN PATENT DOCUMENTS

| 2502028 | 7/1975 | Fed. Rep. of Germany | 174/175 |
| 2308173 | 11/1976 | France | 174/171 |
| 2385966 | 12/1978 | France | 248/74 A |

Primary Examiner—William E. Lyddane
Attorney, Agent, or Firm—Pollock, Vande Sande & Priddy

[57] ABSTRACT

A support for an electrical busbar, made of plastic material, has a recess for holding a busbar. The lower surface of the recess is a resiliently flexible plate supported in the middle by a rib and provided with projections at opposite sides. Adjacent to the mouth of the recess is a resilient detent arm. When a busbar is inserted, it depresses the arm and at least one of the projections by flexing of the plate. The stress in the plate clamps the busbar in the recess, and the arm snaps into place behind the inserted busbar. One of the projections may serve as an end stop for the busbar, if the support is placed at the busbar end. This form of support is easy to manufacture and to use, and provides very reliable clamping and location of the busbar.

8 Claims, 4 Drawing Figures

SUPPORT FOR ELECTRICAL BUSBARS

This invention relates to supports for electrical busbars.

BACKGROUND OF THE INVENTION

German Utility Model Specification No. 74 09 895 discloses a busbar support with a pair of seats for receiving busbars, and hinged flaps for covering the seats and retaining the busbars. This support provides only limited protection against lateral displacement of the busbar, and in particular does not provide reliable restraint when subjected to vibrations or shocks, such as are encountered in the vicinity of machinery. Furthermore, it is difficult to produce this support as a plastic molding. Furthermore the mounting of a busbar in the support requires the operation of pivoting and locking the cover flap.

SUMMARY OF THE INVENTION

The object of the present invention is to provide a busbar support which is easy to produce, in particular as a plastic molding, provides reliable retention of the busbar even in the presence of shocks and vibrations, and is easy to use.

The present invention provides a support for an electrical busbar, comprising a body with a recess for receiving a busbar, which recess is defined between two opposed surfaces of which one is provided with at least one projection towards the opposed surface, the or each projection being resiliently displaceable away from the opposed surface by a busbar inserted into the recess, thereby to clamp the busbar against the opposed surface, the support further comprising a detent adjacent to the mouth of the recess for retaining a busbar inserted in the recess.

Preferably, each recess is designed to accept, at will, busbars of different cross-sectional dimensions.

Such a support can be produced relatively easily as a plastic molding, because an integral detent can be molded relatively easily, compared with a hinged cover flap. Furthermore, the detent will retain the busbar automatically after insertion of the latter, thereby eliminating any additional operations on installation of the busbar.

In a preferred embodiment of the invention, two of the said projections are provided, one in each of two opposite side regions of the associated surface, so that, at the end of a busbar, one of these projections can provide a clamping action while the other acts as an end stop for the busbar.

BRIEF INTRODUCTION TO THE DRAWINGS

In order that the invention may be more clearly understood, reference will now be made to the accompanying drawings, in which several embodiments of the invention are shown for purposes of illustration, and in which.

DESCRIPTION OF A PREFERRED EMBODIMENT

Figure 1:
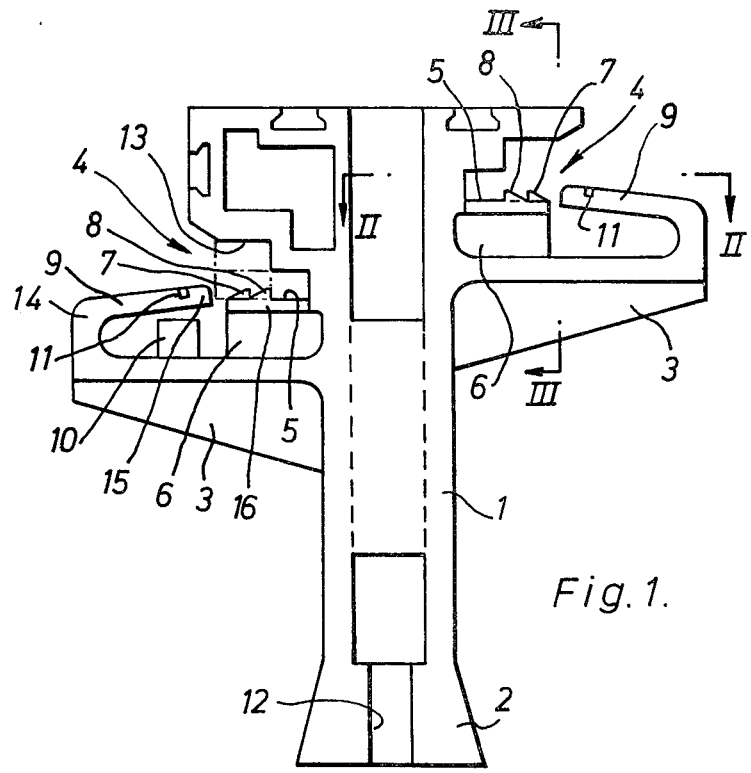
FIG. 1 shows a support embodying the invention, inside view.
Figure 2:
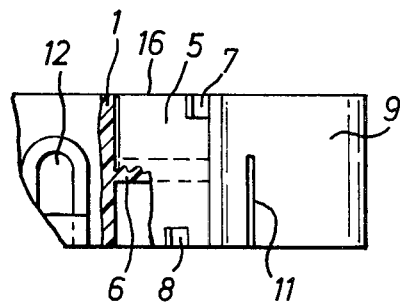
FIG. 2 is a part section of the support along line II—II in FIG. 1, partly broken away.
Figure 3:
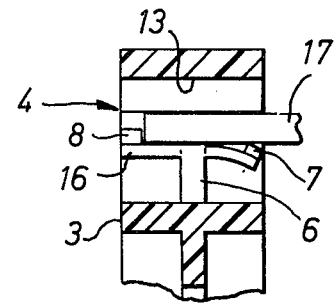
FIG. 3 is a cross-section along line III—III in FIG. 1.

The busbar support shown in FIGS. 1 to 3 is of molded material, with a stem or upright 1 and a foot 2 with a slot 12 for a mounting screw. On each side of the stem is a lateral support arm 3 above each of which is a busbar holder comprising a recess 4. Each recess has a lower surface 5 and an upper surface 13, the latter being stepped so that the recess can accommodate, alternatively, busbars of different cross-sectional dimensions as shown in dot-dash lines in the lefthand recess in FIG. 1. It is to be understood that the support according to the invention is intended mainly for use in relatively low-current installations, e.g., in the control of electrical appliances and machinery. Typically, the busbar will have a cross-sectional area of the order of thirty square millimeters.

Adjacent to the mouth of each recess is a resilient detent arm 9, of which the outer end 14 is integral with the outer end of the corresponding arm 3, and the inner end 15 is free to move up and down by flexing of the arm 9. The arm 9 has a slight slope so that its inner end 15 is proud of the surface 5 whereas the outer end is substantially level with the surface 5. Thus, a busbar can be pushed laterally into the recess, deflecting the arm 9 downwards, the arm then snapping back to its original position when the busbar is fully seated in the recess, so that the inner end of the detent arm firmly and positively holds the busbar in the recess. The arm 9 may have a slot 11 near its inner end, to receive a tool, for example a screw driver, to depress the arm in order to release the busbar. It will be understood that the support is molded from a plastic material with sufficient resilience to permit such flexing of the detent arm. A stop 10 may be provided on the support arm 3 below the detent arm 9, to prevent the latter from being unintentionally depressed too far. The surface 5 is provided on a relatively thin plate 16, the central region of which is supported by a narrow rib 6 extending from the stem 1 and supported by the arm 3. The inner side of the plate 16 is not attached to the stem, so that each half of the plate 16 can flex about the central region of the plate carried by the rib 6. At opposite sides of the plate are respective projections 7, 8 each with a saw-tooth profile to facilitate insertion of a busbar into the recess. Thus, these projections are at the sides of the plate 16 furthest from the rib 6. The projection 7 is at the outermost side of the plate 16 whereas the projection 8 is slightly offset towards the stem 1.

Because of the resilience of the plastic material of the support, each half of the plate 16 can flex downwards independently of the other. When a busbar is inserted in the recess it will depress one or both of the projections 7, 8, thereby deflecting the associated region or regions of the plate 16 by virtue of the resilience of the plastic material used, and the resulting stress in the plate 16 will clamp the busbar against the upper surface 13 of the recess, with the or each projection pressing against the bottom of the busbar.

If the support is at the end of a busbar, the busbar end can rest against the side of one of the projections 7 or 8, the other projection being depressed by the busbar, so that the busbar is both resiliently clamped and positively held against longitudinal displacement. This is possible because the two side regions of the plate 16, and their respective projections, can be deflected independently.

If the support is at an intermediate region of the busbar, the latter will extend through the recess and depress both projections 7,8 with the respective side regions of the plate 16, so that a particularly firm clamping effect is obtained.

In either position, the described support provides positive location and retention of the busbar.

FIG. 3 illustrates the situation in which the projection 8 acts as an end, while the projection 7 serves to clamp an inserted busbar 17.

The relative offset of the projections 7, 8 is not essential but facilitates molding.

Figure 4:
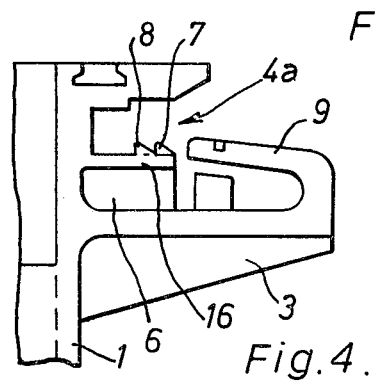
FIG. 4 is a side view of part of a support illustrating modifications.

FIG. 4 shows a modification in which the recess 4a is designed to accommodate only a single size of busbar. FIG. 4 also illustrates the possibility of having the plate 16 integral with the stem 1, in which case the rib 6 may be provided so that the side regions of the plate are free only at the two edges closest to the projections 7,8, the rib 6 may be partly or or entirely omitted.

Numerous other modifications are possible within the scope of the invention. For example, the support may have, instead of a foot 2, at one end, a second pair of arms 3 and recesses 4, possibly of different configurations, to increase the versatility of the support. A mounting screw slot or hole would in this case be provided at each end of the support.

What is claimed is:

1. A support for an electrical busbar, comprising a body with a recess for receiving a busbar by movement of the latter transverse to its length, said body comprising a plate having side regions, said recess being defined between first and second opposed surfaces the first one of which is a surface of said plate, a respective projection being provided at each side of said plate, said projections projecting towards said second opposed surface, a rib being provided for supporting the central region of said plate between said projections, whereby the respective side regions of said plate are independently resiliently deflectable, thereby permitting independent resilient displacement of said projections away from said second opposed surface by a busbar inserted into said recess, thereby to reclamp the busbar against said second opposed surface, said support further comprising a resilient detent member disposed adjacent to the mouth of said recess for permitting insertion of a busbar into said recess and retaining the inserted busbar in said recess.

2. A support as claimed in claim 1, having a plurality of said projections respectively at different distances from said mouth of said recess, said projections being resiliently displaceable independently of one another.

3. A support as claimed in claim 1, comprising a stem portion and a lateral arm supporting said rib and extending from said stem portion.

4. A support as claimed in claim 3, wherein said detent is a resilient arm having a free inner end adjacent to said mouth of said recess and a fixed outer end, said inner end when unstressed being proud of said first opposed surface and said resilient detent member having its outer end fixed at the outer end of said lateral arm.

5. A support as claimed in claim 4, comprising a stop on said lateral arm for limiting deflection of said resilient arm.

6. A support as claimed in claim 1, wherein said detent is a resilient arm having a free inner end adjacent to said mouth of said recess and a fixed outer end the inner end when unstressed being proud of said first opposed surface.

7. A support as claimed in claim 1, wherein said recess has locating surfaces for respectively accommodating busbars of different cross-sectional dimensions.

8. A busbar support as claimed in claim 1, wherein said detent is adapted to retain the inserted busbar with a snap action.

* * * * *